United States Patent
Yildiz et al.

(10) Patent No.: US 12,093,457 B2
(45) Date of Patent: *Sep. 17, 2024

(54) CREATION OF OPTIMAL WORKING, LEARNING, AND RESTING ENVIRONMENTS ON ELECTRONIC DEVICES

(71) Applicant: Apple Inc., Cupertino, CA (US)

(72) Inventors: Izzet B. Yildiz, Sunnyvale, CA (US); Mary A. Pyc, Campbell, CA (US); Ronald J. Guglielmone, Jr., Redwood City, CA (US); Sterling R. Crispin, Santa Cruz, CA (US); Mikaela D. Estep, Sunnyvale, CA (US); Grant H. Mulliken, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,324

(22) Filed: Sep. 7, 2023

(65) Prior Publication Data

US 2023/0418378 A1 Dec. 28, 2023

Related U.S. Application Data

(63) Continuation of application No. 17/030,614, filed on Sep. 24, 2020, now Pat. No. 11,782,508.
(Continued)

(51) Int. Cl.
*G06F 3/01* (2006.01)
*G06T 19/00* (2011.01)
*G06V 40/20* (2022.01)

(52) U.S. Cl.
CPC .............. *G06F 3/015* (2013.01); *G06F 3/012* (2013.01); *G06T 19/006* (2013.01); *G06V 40/20* (2022.01); *G06F 2203/011* (2013.01)

(58) Field of Classification Search
CPC .. G06F 3/012; G06F 2203/011; G06T 19/006; G06V 40/20; G09B 5/06; G09B 19/00
See application file for complete search history.

(56) References Cited

U.S. PATENT DOCUMENTS 9,612,654 B2 * 4/2017 Brokken ................. G06F 3/015
9,727,946 B2 8/2017 Scherlen
(Continued)

FOREIGN PATENT DOCUMENTS

CN 1998219 7/2007
WO 2014/015378 A1 1/2014
(Continued)

OTHER PUBLICATIONS

PCT, European Patent Office (ISA/EP), International Search Report and Written Opinion of the International Searching Authority, International Application No. PCT/US2020/051897, 12 pages (Dec. 1, 2020).
(Continued)

*Primary Examiner* — Mihir K Rayan
(74) *Attorney, Agent, or Firm* — Thompson Hine LLP

(57) ABSTRACT

Some implementations disclosed herein present a computer-generated reality (CGR) environment in which a user participates in an activity, identify a cognitive state of the user (e.g., working, learning, resting, etc.) based on data regarding the user's body (e.g., facial expressions, hand movements, physiological data, etc.), and update the environment with a surrounding environment that promotes a cognitive state of the user for the activity.

20 Claims, 9 Drawing Sheets

Related U.S. Application Data

(60) Provisional application No. 62/907,114, filed on Sep. 27, 2019.

(56) References Cited

U.S. PATENT DOCUMENTS

| | | | |
|---|---|---|---|
| 10,606,353 | B2 | 3/2020 | Ce Coleman et al. |
| 11,307,650 | B1 | 4/2022 | Guerra et al. |
| 11,364,361 | B2 | 6/2022 | Poltorak |
| 11,452,839 | B2 | 9/2022 | Poltorak |
| 11,782,508 | B2 * | 10/2023 | Yildiz .................... G09B 19/00 600/544 |
| 2014/0125581 | A1 | 5/2014 | Chitkara et al. |
| 2014/0316192 | A1 * | 10/2014 | de Zambotti .......... A61B 5/486 600/27 |
| 2015/0351655 | A1 | 12/2015 | Coleman |
| 2016/0077547 | A1 | 3/2016 | Aimone |
| 2017/0265798 | A1 | 9/2017 | Sales |
| 2017/0323481 | A1 | 11/2017 | Tran et al. |
| 2019/0019089 | A1 | 1/2019 | Baughman et al. |
| 2019/0163258 | A1 | 5/2019 | Baughman et al. |
| 2019/0223746 | A1 | 7/2019 | Intrator |
| 2019/0269345 | A1 | 9/2019 | Sriram |
| 2020/0004321 | A1 | 1/2020 | Kawano |
| 2020/0344508 | A1 | 10/2020 | Edwards |
| 2020/0390337 | A1 | 12/2020 | Frank et al. |
| 2021/0030308 | A1 | 2/2021 | Grace et al. |
| 2021/0041953 | A1 | 2/2021 | Poltorak |
| 2021/0345905 | A1 | 11/2021 | Liu et al. |
| 2021/0349536 | A1 | 11/2021 | Crispin et al. |
| 2022/0001238 | A1 | 1/2022 | Kwatra |
| 2024/0115831 | A1 * | 4/2024 | Welch ................... A61M 21/02 |

FOREIGN PATENT DOCUMENTS

| | | |
|---|---|---|
| WO | 2019/067731 A1 | 4/2019 |
| WO | 2023283161 A1 | 1/2023 |

OTHER PUBLICATIONS

Parsons, T.D. et al., "Adaptive Virtual Environments for Neuropsychological Assessment in Serious Games," IEEE Transactions on Consumer Electronics, vol. 58, No. 2, pp. 197-204 (May 2012).

Dauden Roquet, C. and Sas, C., "Body Matters: Exploration of the Human Body as a Resource for the Design of Technologies for Meditation," Proceedings of the 2020 ACM Designing Interactive Systems Conference, ACMPUB27, New York, NY, pp. 533-546, 2020 2020.

Gromala, Diane; Tong, Xin; Choo, Amber; Karamnejad, Mehdi; Shaw, Chris D.; "The Virtual Meditative Walk: Virtual Reality Therapy for Chronic Pain Management"; Making & Sharing Assistive Technologies; CHI 2015, Crossings, Seoul, Korea; Apr. 18-23, 2015, pp. 521-524. 2015.

Rockstroh, Christoph; Blum, Johannes; Hardt, Veronique; Goriz, Anja S.; "Design and Evaluation of a Virtual Restortative Walk with Room-Scale Virtual Reality and Impossible Spaces"; Frontiers in Virtual Reality; Nov. 20, 2020; pp. 1-13. 2020.

Hinkle, Lee B.; Roudposhti, Kamrad Khoshhal; Metsis, Vangelis; "Physiological Measurement for Emotion Recognition in Virtual Reality"; 2019 2nd International Conference on Data Intelligence and Security (ICDIS); pp. 1-8. 2019.

Quesnel, Denise; Stepanova, Ekaterina R.; Aguilar, Ivan A.; Pennefather, Patrick; Riecke, Bernhard E.; "Creating AWE: Artistic and scientific practices in research-based design for exploring a profound immersive installation"; 2018 IEEE Games, Entertainment, Media Conference (GEM); pp. 200-207. 2018.

* cited by examiner

CREATION OF OPTIMAL WORKING, LEARNING, AND RESTING ENVIRONMENTS ON ELECTRONIC DEVICES

CROSS-REFERENCE TO RELATED APPLICATION

This application is a Continuation of U.S. patent application Ser. No. 17/030,614 filed Sep. 24, 2020, which claims the benefit of U.S. Provisional Application Ser. No. 62/907,114 filed Sep. 27, 2019, each of which are incorporated herein in its entirety.

TECHNICAL FIELD

The present disclosure generally relates to displaying content on electronic devices, and in particular, to systems, methods, and devices for promoting a cognitive state of a user for a particular user activity.

BACKGROUND

A user's cognitive state while viewing content on an electronic device can have a significant effect on the user's ability to work or learn. For example, staying focused and engaged while using a head-mounted device (HMD) in a computer-generated reality (CGR) environment may be required for meaningful experiences, such as learning a new skill, watching educational or entertaining content, or reading a document. Improved techniques for assessing and promoting the cognitive state of a user viewing and interacting with content may enhance the user's productivity and ability to interact with the content. Consequently, content creators and display systems may be able to provide better user experiences that a user is more likely to enjoy, comprehend, and learn from based on being able to determine the user's cognitive state.

SUMMARY

Attributes of content may result in particular types of physiological responses in users viewing the content. For example, users may have different preferences when it comes to optimal working, learning, and resting conditions. Some users may like to work in a quiet environment with low light, whereas other users may prefer to work with music and bright light. Clutter in a room or on a desk may increase creativity for some, but may be distracting for others. Similarly, the optimal resting environment is both individualized and contextual. In some cases, users may not even be aware that they need a break, or they may not realize the most restorative environment for themselves. Creating optimal, individualized environments for users to work, learn and rest in a computer-generated reality (CGR) environment, and presenting them at the right time, can benefit users by increasing their productivity and learning efficiency while also providing them with the necessary resting opportunity when such an environment is not readily available in their surroundings.

Implementations herein recognize that the physiological response (e.g., heart rate, breath rate, brain activity, user satisfaction, facial expressions, body language, etc.) of a user over time, or in response to a change in CGR environment, may be indicative of the user's cognitive state or preference in CGR environment. For example, the pupils of users may experience dilation or constriction at different rates for different cognitive states. By presenting a user participating in an activity with multiple surrounding environments (e.g., living room, library, office, forest, coffee shop, ocean, waterfall, babbling brook, etc.), obtaining data regarding the user's body, and assessing the obtained data for each surrounding environment, implementations may identify a particular surrounding environment that promotes a positive, or otherwise desirable, cognitive state of the user for the activity (e.g., identifying the optimal environment that puts the user in a most relaxed or most restful state).

Moreover, implementations may identify a cognitive state of the user and suggest a change in user activity. For example, implementations may detect fatigue while the user is working, or may detect that the user has relaxed while the user activity is relaxing or taking a break. Based on the detection, implementations may then show the user's favorite calm forest when the user is fatigued, or show a working/learning inspiring environment when the user is rested.

In some implementations, parameters of the surrounding environment, such as colors, light level, décor, sound, music, volume, etc., are changed in order to identify particular parameters that promote the cognitive state of the user for the activity. In some implementations, physiological data of the user is obtained via a heart rate sensor, pulse oximeter, blood pressure sensor, temperature sensor, electrocardiogram (EKG) sensor, electroencephalography (EEG) sensor, electromyography (EMG) sensor, functional near infrared spectroscopy signal (fNIRS) sensor, galvanic skin response (GSR) sensor, etc. Furthermore, inward facing cameras may record eye characteristics (e.g., eye tracking or pupillary response) or downward-facing cameras may record facial expressions. Image-based or sensor-based hand/body tracking may be used to identify movements associated with stress, relaxation, etc.

In some implementations, a context of the content or activity is used to identify a present cognitive state of the user or a desired cognitive state of the user. For example, if the user activity consists of working, implementations may identify that the user desires a productive, calm, or relaxed cognitive state. In some implementations, information about the user's preferences and past activities, and attributes of the content may be used to identify or promote the cognitive state of the user. In some implementations, a message is displayed to the user to make the user aware of his or her cognitive state, suggest a break, or provide an option to change environments, and in some implementations, an action may take place automatically (e.g., automatically changing environments based on the cognitive state of the user). In some implementations, the content creator collects or receives data, based on privacy settings, in order to optimize the environment of the user. For example, the content creator may save associated data, modify content, or update the environment of other similar users performing similar activities.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may

Figure 1:
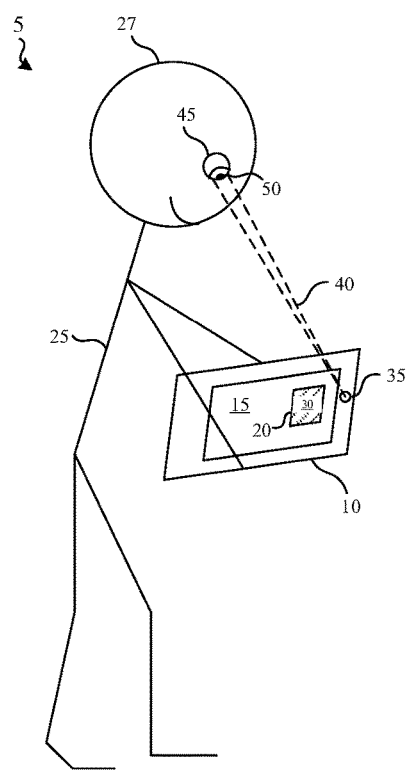
FIG. 1 illustrates a device displaying content and obtaining physiological data from a user according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates a physical environment 5 including a device 10 (e.g., a hand-held device) with a display 15. The device 10 may include an integrated controller or may be in communication with a separate controller, one or both of which may be in the physical environment 5. A physical environment refers to a physical world that people can sense and/or interact with without aid of electronic systems. Physical environments, such as a physical park, include physical articles, such as physical trees, physical buildings, and physical locations, and physical people (e.g., user 25). People can directly sense and/or interact with the physical environment 5, such as through sight, touch, hearing, taste, and smell.

Figure 6A:
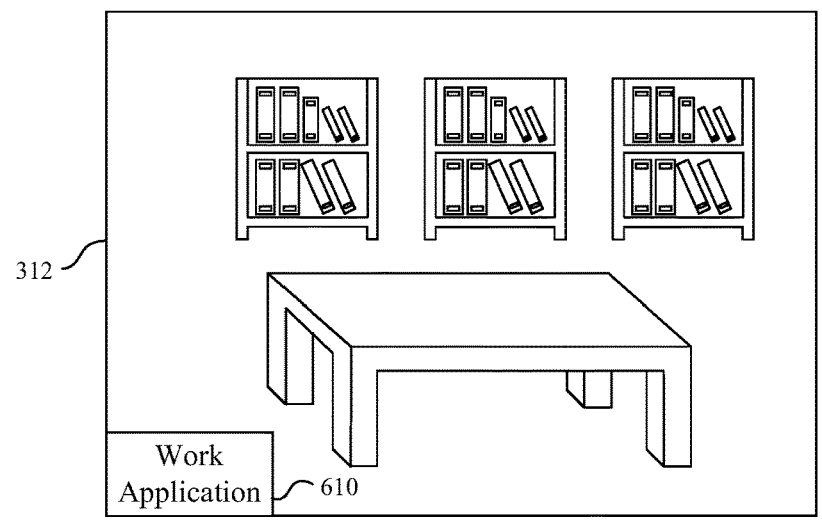
FIGS. 6A, 6B, and 6C illustrate a productivity application and different environments in accordance with some implementations.
Figure 6B:
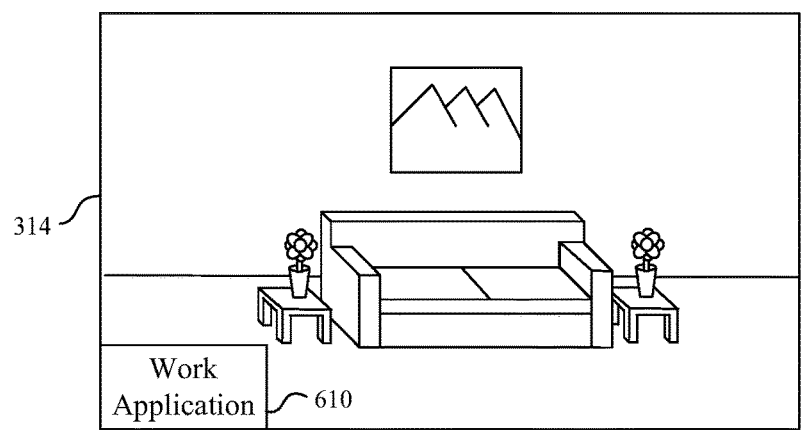
Figure 6C:
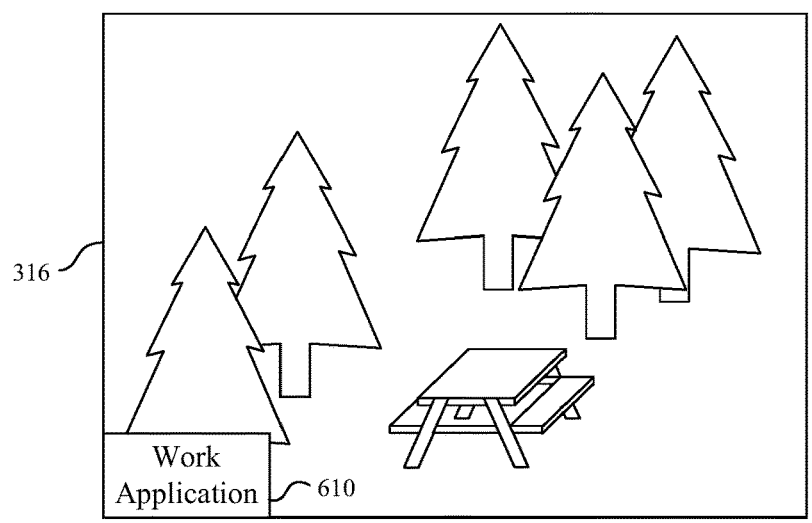

In some implementations, the device 10 is configured to manage, coordinate, and, present a computer-generated reality (CGR) environment to the user 25. In some implementations, the device 10 includes a suitable combination of software, firmware, or hardware. The device 10 is described in greater detail below with respect to FIG. 6 and FIG. 7. In some implementations, a controller of the device 10 is a computing device that is local or remote relative to the physical environment 5. In some implementations, the functionalities of the controller of the device 10 are provided by or combined with the device 10, for example, in the case of a hand-held device or head-mounted device (HMD) that functions as a stand-alone unit.

In one example, a controller of the device 10 is a local server located within the physical environment 5. In another example, the controller of the device 10 is a remote server located outside of the physical environment 5 (e.g., a cloud server, central server, etc.). In some implementations, the controller of the device 10 is communicatively coupled with the device 10 via one or more wired or wireless communication channels (e.g., BLUETOOTH, IEEE 802.11x, IEEE 802.16x, IEEE 802.3x, etc.).

According to some implementations, the device 10 presents a CGR environment to the user 25 while the user 25 is present within the physical environment 5. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment 5, which are representations of the physical environment 5. The system composites the images or video with virtual objects and presents the composition on the opaque display. A person, using the system, indirectly views the physical environment 5 by way of the images or video of the physical environment 5, and perceives the virtual objects superimposed over the physical environment 5. As used herein, a video of the physical environment 5 shown on an opaque display is called "pass-through video," meaning a system uses one or more image sensor(s) to capture images of the physical environment 5 and uses those images in presenting the AR environment on the opaque display. Further alternatively, a system may have a projection system that projects virtual objects into the physical environment 5, for example, as a hologram or on a physical surface, so that a person, using the system, perceives the virtual objects superimposed over the physical environment 5.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As shown in FIG. 1, in some implementations, the device 10 displays content 20 to a user 25. The content 20 may include a video, a presentation, other time-varying content, or content presented as part of a CGR environment. In some implementations, the device 10 is configured to obtain image data or physiological data (e.g., pupillary data, electrocardiography (EKG) data, etc.) about a body of the user 25 via one or more sensors. In some implementations, the inputs used by the device 10 to collect data about a body of the user 25 include cameras (e.g., to detect body language, perform hand-tracking, identify facial expressions, etc.), microphones (e.g., to identify tone of voice), and physiological sensors (e.g., to measure pupil size, gaze, electroencephalography (EEG), EKG, electromyography (EMG), functional near infrared spectroscopy signal (fNIRS), galvanic skin response (GSR), pulse, respiratory rate, etc.). Moreover, in some implementations, the device may also determine content or context of the content 20 (e.g., a location of the user, language, tone of voice, pictures and videos, etc.).

In some implementations, the device 10 may associate the captured image data or physiological data with a cognitive state of the user 25. For example, the device 10 may analyze various factors in real time to determine the cognitive state of the user. In some implementations, the body language of the user 25 is modeled using user position data, combined with hand tracking technologies, and inferred or measured body posture. In some implementations, the device 10 utilizes a computational model of cognitive state assessment, including detecting the body language associated with a cognitive state, and any corresponding physiological signs of the cognitive state. For example, combining body language detection, such as yawning, with a decreased heart rate may provide a heightened indicator the user is tired or bored and not engaged in a working activity.

Users will have the option to opt in or out with respect to whether his or her user data is obtained or used or to otherwise turn on and off any features that obtain or use user information. Moreover, each user will have the ability to access and otherwise find out anything that the system has collected or determined about him or her. User data is stored securely on the user's device. For example, user data associated with the user's body and/or cognitive state may be stored in a secure enclave on a user's device, restricting access to the user data and restricting transmission of the user data to other devices.

While the device 10 is illustrated as a hand-held device, other implementations involve devices with which a user interacts without holding and devices worn by a user. In some implementations, as illustrated in FIG. 1, the device 10 is a handheld electronic device (e.g., a smartphone or a tablet). In some implementations the device 10 is a laptop computer or a desktop computer. In some implementations, the device 10 has a touchpad and, in some implementations, the device 10 has a touch-sensitive display (also known as a "touch screen" or "touch screen display"). In some implementations, the device 10 is or is in communication with a wearable device such as a head mounted display (HMD), watch, or armband.

Moreover, while this example and other examples discussed herein illustrate a single device 10 in a physical environment 5, the techniques disclosed herein are applicable to multiple devices as well as to multiple real-world environments. For example, the functions of device 10 may be performed by multiple devices.

In some implementations, the device 10 includes an eye tracking system for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate the eyes of the user 25 and the NIR camera may capture images of the eyes of the user 25. In some implementations, images captured by the eye tracking system may be analyzed to detect position and movements of the eyes of the user 25, or to detect other information about the eyes such as pupil dilation or pupil diameter. Moreover, the point of gaze estimated from the eye tracking images may enable gaze-based interaction with content.

In some implementations, the device 10 has a graphical user interface (GUI), one or more processors, memory and one or more modules, programs or sets of instructions stored in the memory for performing multiple functions. In some implementations, the user 25 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, the device 10 employs various physiological sensor, detection, or measurement systems. Detected physiological data may include, but is not limited to, EEG, EKG, EMG, fNIRS, blood pressure, GSR, or pupillary response. Moreover, the device 10 may simultaneously detect multiple forms of physiological data in order to benefit from synchronous acquisition of physiological data. Moreover, in some implementations, the physiological data represents involuntary data, e.g., responses that are not under conscious control. For example, a pupillary response may represent an involuntary movement.

In some implementations, one or both eyes 45 of the user 25, including one or both pupils 50 of the user 25 present physiological data in the form of a pupillary response. The pupillary response of the user 25 results in a varying of the size or diameter of the pupil 50, via the optic and oculomotor cranial nerve. For example, the pupillary response may include a constriction response (miosis), e.g., a narrowing of the pupil, or a dilation response (mydriasis), e.g., a widening of the pupil. In some implementations, the device 10 may detect patterns of physiological data representing a time-varying pupil diameter.

Figure 2:
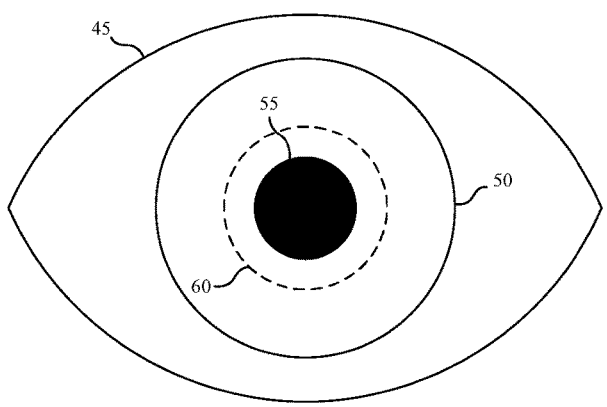
FIG. 2 illustrates a pupil of the user of FIG. 1 in which the diameter of the pupil varies.

FIG. 2 illustrates a pupil 50 of the user 25 of FIG. 1 in which the diameter of the pupil 50 varies with time. As shown in FIG. 2, a present physiological state (e.g., present pupil diameter 55) may vary in contrast to a past physiological state (e.g., past pupil diameter 60). For example, the present physiological state may include a present pupil diameter and a past physiological state may include a past pupil diameter. The physiological data may represent a response pattern that dynamically varies over time.

The device 10 may use the physiological data to implement the techniques disclosed herein. For example, a user's pupillary response to an environment change in the content 20 may be compared with the user's prior responses to similar environment change events in the same or other content.

Figure 3:
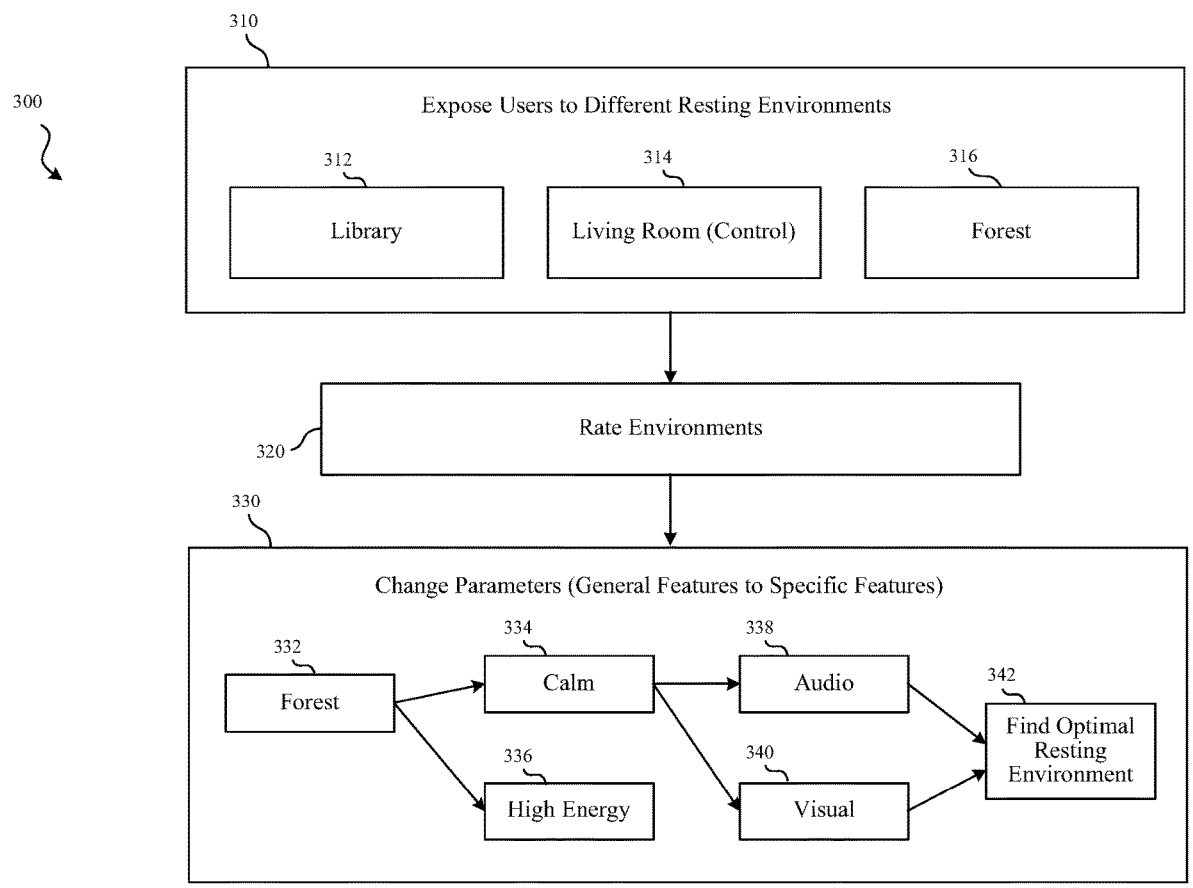
FIG. 3 is a flowchart illustrating selecting an environment by rating different environments and changing parameters of the selected environment in accordance with some implementations.

FIG. 3, in accordance with some implementations, is a flowchart illustrating a method 300 for selecting an environment by rating different environments and changing parameters of the selected environment. In some implementations, the method 300 is performed by one or more devices (e.g., device 10). The method 300 can be performed at a mobile device, HMD, desktop, laptop, or server device. The method 300 can be performed on an HMD that has a screen for displaying 3D images or a screen for viewing stereoscopic images. In some implementations, the method 300 is performed by processing logic, including hardware, firmware, software, or a combination thereof. In some implementations, the method 300 is performed by a processor executing code stored in a non-transitory computer-readable medium (e.g., a memory).

Figure 4A:
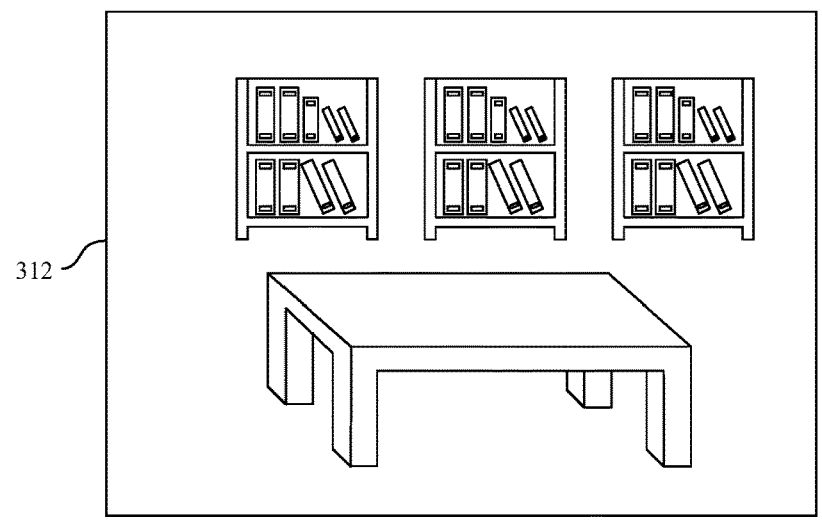
FIGS. 4A, 4B, and 4C illustrate different environments in accordance with some implementations.
Figure 4B:
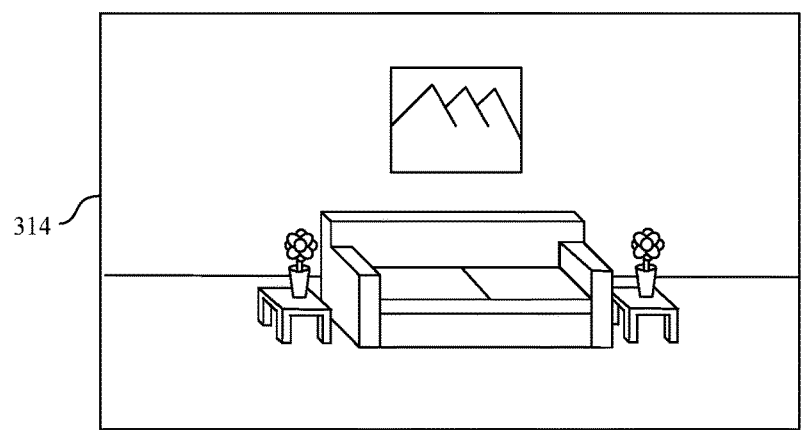
Figure 4C:
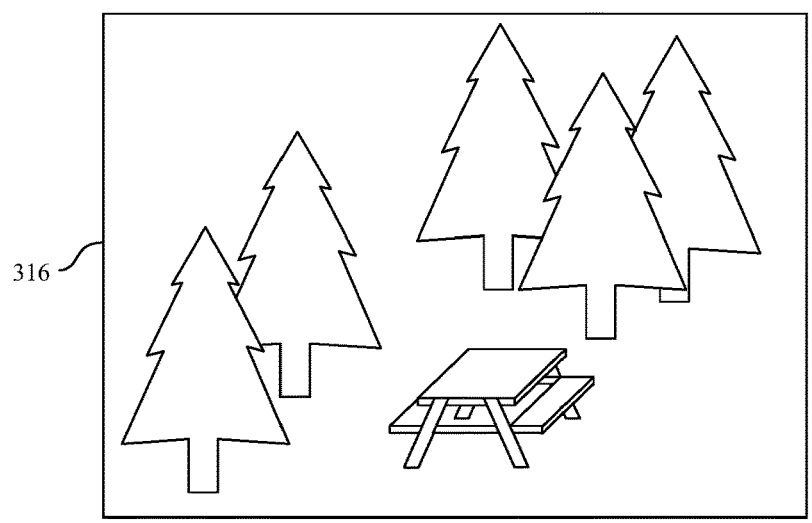

At block 310, the method 300 exposes users to different environments by displaying content including each of the different environments to a user on a display of a device, e.g., resting environments. For example, as illustrated in FIGS. 4A-4C, a user may be exposed to a library environment 312, a living-room control environment 314, and a forest environment 316.

At block 320, the method 300 rates each of the environments based on the user's response to the environment. In some implementations, physiological (e.g., eye-tracking, pupil diameter, heart rate, respiratory rate, GSR, etc.), neural (e.g., EEG, fNIRS, etc.), and behavioral signals (facial gestures, user ratings and performance, etc.) are combined by method 300 to rate each environment. For example, in resting mode, heart and respiratory rates may slow down, heart rate variability (HRV) may increase, and pupil diameter and brain activity as measured by EEG or fNIRS resembles default activity. Furthermore, in learning and working mode, heart and respiratory rates may increase to normal levels, HRV may decrease, pupil diameter and brain activity may show maximum task involvement, and the user may demonstrate enhanced levels of focus and concentration.

At block 330, the method 300 may change parameters of the surrounding environments, for example, from general features to specific features. In some implementations, the method 300 finds individualized optimal working, learning, and resting conditions by iteratively updating the VR audio-visual environment. For example, some of the parameters to be adapted may include location (living room, nature, coffee shop, etc.), light color, intensity, proximity and direction, audio loudness, music genre, noise type (white, pink, etc.) and type of natural sounds (forest, city, ocean, waterfall, babbling brook, etc.). Moreover, each parameter may be adapted independently and/or jointly over time until the body data of the user indicates that the environment is optimized.

In some implementations, the environment includes a background of a setting (e.g., a backdrop of a forest), immediate surroundings associated with the setting (e.g., furniture of a library), or any number of other audio or visual features associated with the setting (e.g., sounds of pages turning, rain, white noise, etc.). As an example, if the user is working, the method 300 may transport the user to an environment such as a forest, beach, library or coffee shop that is not readily available in the user's surroundings. In some implementations, the method 300 automatically adapts the environment parameters to increase productivity without interrupting the experience. Moreover, the method 300 may identify relaxing environments depending on an individual's physiology which may be different than what the user previously considered to be relaxing, thereby enabling longer productivity sessions by preventing exhaustion and mental fatigue.

In some implementations, alternative parameters (e.g., calm, high energy, etc.) are selected based on testing the actual effect (e.g., the impact on the user's cognitive state) of using the surrounding environment with each of the parameters or combination of parameters. For example, as shown in block 330 of FIG. 3, a resting environment may include a forest 332, and then parameters such as "calm" 334 or "high energy" may be associated with the environment and presented to the user. Based on the impact on the user's cognitive state, the method 300 may determine that the user is in a more relaxed or peaceful cognitive state when the forest 332 environment is associated with a calm 334 parameter, and the method 300 may explore different audio 338 and visual 340 parameters to ultimately find an optimal resting environment 342.

Figure 5:
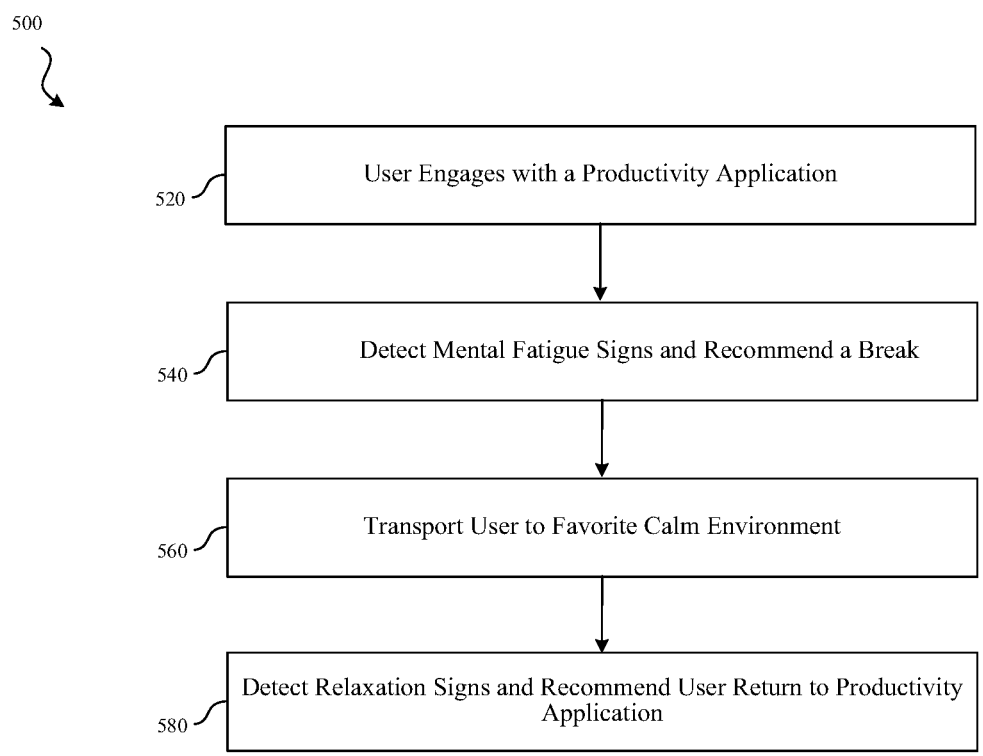
FIG. 5 is a flowchart illustrating promoting a user activity based on detecting a cognitive state of the user in accordance with some implementations.

FIG. 5, in accordance with some implementations, is a flowchart illustrating a method 500 for promoting a user activity based on detecting a cognitive state of the user. For example, while using an HMD in a CGR environment, a user may be unaware of when he or she should be working or learning and when they should relax or rest. In some implementations, the method 500 is performed by one or more devices (e.g., device 10). The method 500 can be performed at a mobile device, HMD, desktop, laptop, or server device. The method 500 can be performed on an HMD that has a screen for displaying 3D images or a screen for viewing stereoscopic images. In some implementations, the method 500 is performed by processing logic, including hardware, firmware, software, or a combination thereof. In some implementations, the method 500 is performed by a processor executing code stored in a non-transitory computer-readable medium (e.g., a memory).

At block 520, the method 500 displays content to a user on a display of a device and the user engages with a productivity application. For example, the user may engage with a productivity application (e.g., work application 610 illustrated in FIGS. 6A-6C) for twenty minutes. In some implementations, the content displayed to the user includes a suitable surrounding environment for the activity of the user (e.g., work application 610 engaged in various environments, including library 312, living room 314, forest 316, etc.). For example, if the user is working or studying, the surrounding environment may include an optimized library setting, e.g., a library setting including tailored settings to optimize the productivity of the user.

At block 540, the method 500 detects a change in cognitive state of the user and recommends the user take a break from the productivity application. In some implementations, the method 500 combines physiological (e.g., eye-tracking, pupil diameter, heart rate, respiratory rate, GSR, etc.), neural (e.g., EEG, fNIRS, etc.), and behavioral signals (e.g., facial gestures, user ratings and performance, etc.) to identify a cognitive state of the user. For example, the method may detect mental fatigue signs and recommend the user take a break.

In some implementations, examples of cognitive states include, but are not limited to, attentive, inattentive, perceptive, focused, imperceptive, distracted, interested, disinterested, curious, inquisitive, doubtful, critical, certain, deciding, assessing, assessing logically, assessing emotionally, receptive, unreceptive, day-dreaming, thinking, observing, relaxed, processing information, relating to past experience, remembering, mindful, mind-wandering, tired, rested, alert, attracted, repelled, guilty, and indignant. Assessing the cognitive state of the user may involve determining a level or extent of a type of cognitive state, e.g., determining the extent of attentiveness or an extent of inattentiveness on a numerical scale. As a particular example, depending on the pupillary response magnitude the method 500 may determine that a user was attentive with a score of 0.6 on a normalized scale from 0 to 1 (0 being inattentive and 1 being fully focused).

In some implementations, the cognitive state is determined using a statistical or machine learning-based classification technique. For example, pupil responses may be aggregated and classified into different cognitive states using statistical or machine-learning based techniques. In one example, a pupillary response is classified as attentive, inattentive, or neutral. In another example, a pupillary response is classified as observing or processing information.

In some implementations, the physiological data of the user is compared with the user's own prior responses to determine the user's current cognitive state. In some implementations, the physiological data of the user is assessed based on the physiological responses of the user to various types of content, e.g., comparing the user's current pupillary response with a typical or average user response. In some implementations, observing trends of physiological data over a duration of time (e.g., seconds to minutes) may provide insights about the underlying cognitive state of the user at different time scales.

Users will have the option to opt in or out with respect to whether his or her user data is obtained or used or to otherwise turn on and off any features that obtain or use user information. Moreover, each user will have the ability to access and otherwise find out anything that the system has collected or determined about him or her. User data is stored securely on the user's device. User data that is used as input to a machine learning model is stored securely on the user's device, for example, to ensure the user's privacy. The user's device may have a secure storage area, e.g., a secure enclave, for securing certain user information, e.g., data from image and other sensors that is used for face identification, face identification, or biometric identification. The user data associated with the user's body and/or cognitive state may be stored in such a secure enclave, restricting access to the user data and restricting transmission of the user data to other devices to ensure that user data is kept securely on the user's device. User data may be prohibited from leaving the user's device and may be used only in machine learning models and other processes on the user's device.

In some implementations, the method 500 provides feedback to the user based on the user's cognitive state. For example, the method 500 may detect an attention lapse and provide a notification for the user to take a break, re-watch a particular portion of the content, or change the content presentation speed. In another example, the method 500 may detect a heightened attention moment in the content and suggest similar moments of content for the user. In another example, a notification may be provided for a user to view content at a particular time or under particular conditions based on determining a cognitive state profile for the user. For example, such a profile may indicate that the user is more attentive in the mornings than in the afternoon or evening and a notification may be provided at 8:30 am suggesting to the user that now is a good time to study or work with the content.

At block 560, the method 500 transports the user to a different environment based on the user's change in activity. For example, if the user has changed their activity from working to resting, the user may be transported to their favorite calm forest environment, e.g., the surrounding environment may be changed to a calm forest environment. In some implementations, content is automatically adjusted according to automatically-determined environment parameters based on a user's cognitive state.

Accordingly, the method 500 provides a flexible and subtle way to afford a user with a break without requiring a behavioral response and interruption (e.g., the user may not need to "think about" when or whether they should take a break). The method 500 may be provided to users who want to learn a new skill, watch a lecture, or perform a task that requires a long attention span, amongst numerous other uses cases, and may provide such users with information to facilitate the users' purposes. Moreover, providing the user with timely breaks or resting periods may allow more productive working and learning schedules.

At block 580, the method 500 detects a change in cognitive state (e.g., state of relaxation) and recommends the user return to the productivity application. For example, the method 500 may use biological signals or an algorithm to detect that the user is in a relaxed state. For example, the user may reach a relaxed state after a three-minute break and the method 500 may recommend the user go back to a learning or productivity application.

In some implementations, the method 500 provides feedback to a content creator to facilitate improvements to the content or future/related content. A notification may identify a portion of the content associated with a cognitive state for one or more users, e.g., identifying that during a particular portion of the content users were typically less attentive than during another portion of the content. In some implementations, cognitive state data for multiple users who have viewed the content is aggregated to provide feedback regarding the content. The content creator may revise the content based on such feedback to make that portion shorter or more attention grabbing.

Figure 7:
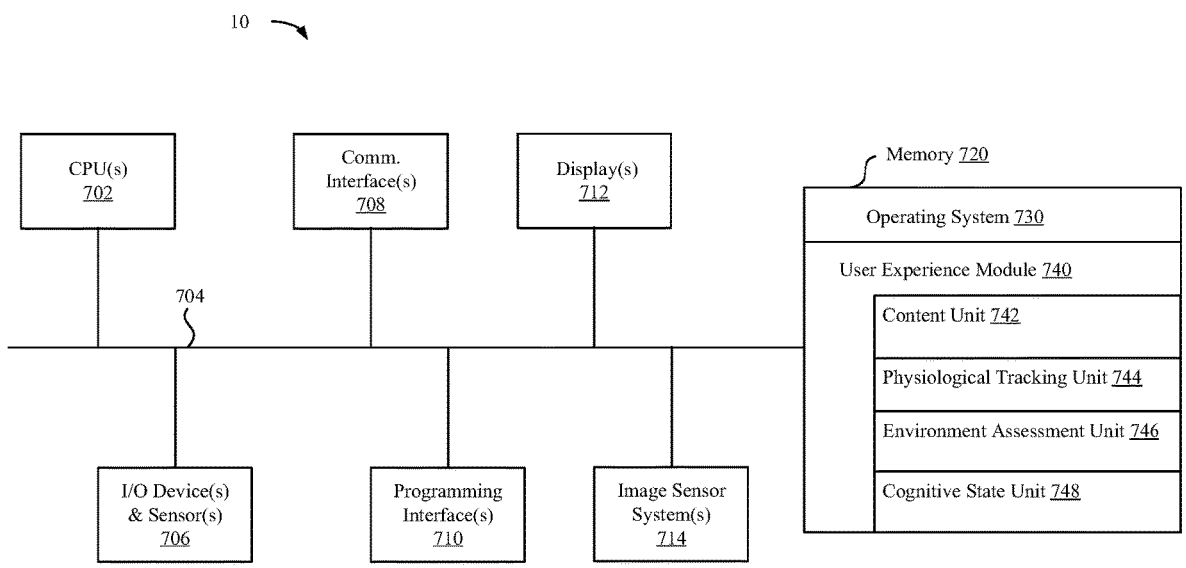
FIG. 7 is a block diagram illustrating device components of an exemplary device according to some implementations.

FIG. 7 is a block diagram of an example of a device 10 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 710, one or more displays 712, one or more interior and/or exterior facing image sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 406 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 712 are configured to present a user experience to the user 25. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), microelectromechanical system (MEMS), a retinal projection system, and/or the like display types. In some implementations, the one or more displays 712 correspond to diffractive, reflective, polarized, holographic, etc. waveguide displays. In one example, the device 10 includes a single display. In another example, the device 10 includes a display for each eye of the user 25, e.g., an HMD. In some implementations, the one or more displays 712 are capable of presenting CGR content.

In some implementations, the one or more image sensor systems 714 are configured to obtain image data that corresponds to at least a portion of the face of the user 25 that includes the eyes of the user 25. For example, the one or more image sensor systems 714 include one or more RGB camera (e.g., with a complimentary metal-oxide-semiconductor (CMOS) image sensor or a charge-coupled device (CCD) image sensor), monochrome camera, IR camera, event-based camera, and/or the like. In various implementations, the one or more image sensor systems 714 further include illumination sources that emit light upon the portion of the face of the user 25, such as a flash or a glint source.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some implementations, the memory 720 or the non-transitory computer readable storage medium of the memory 720 stores the following programs, modules and data structures, or a subset thereof including an optional operating system 730 and a user experience module 740.

The operating system 730 includes procedures for handling various basic system services and for performing hardware dependent tasks. In some implementations, the user experience module 740 is configured to display content on electronic devices assess the cognitive states of users viewing such content. To that end, in various implementations, the user experience module 740 includes a content unit 742, a physiological tracking unit 744, an environment assessment unit 746, and a cognitive state unit 748.

In some implementations, the content unit 742 is configured to provide and/or track content for display on a device. The content unit 742 may be configured to monitor user activity, track the context of the content over time, and/or to identify user activity that occurs within the content. In some implementations, the content unit 742 may be configured to tailor content to a specific user using one or more of the techniques discussed herein or as otherwise may be appropriate. To these ends, in various implementations, the unit includes instructions and/or logic therefor, and heuristics and metadata therefor.

In some implementations, the physiological tracking (e.g., body language, hand-tracking, facial expressions, physiological data, etc.) unit 744 is configured to track a user's body movement or other physiological attributes using one or more of the techniques discussed herein or as otherwise may be appropriate. To these ends, in various implementations, the unit includes instructions and/or logic therefor, and heuristics and metadata therefor.

In some implementations, the environment assessment unit 746 is configured to assess and adapt the surrounding environment in relation to an activity of the user using one or more of the techniques discussed herein or as otherwise may be appropriate. To these ends, in various implementations, the unit includes instructions and/or logic therefor, and heuristics and metadata therefor.

In some implementations, the cognitive state unit 748 is configured to assess the cognitive state of a user based on a physical (e.g., body) response using one or more of the techniques discussed herein or as otherwise may be appropriate. To these ends, in various implementations, the unit includes instructions and/or logic therefor, and heuristics and metadata therefor.

Although the units and modules of FIG. 7 are shown as residing on a single device (e.g., the device 10), it should be understood that in other implementations, any combination of these units may be located in separate computing devices.

Moreover, FIG. 7 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 8:
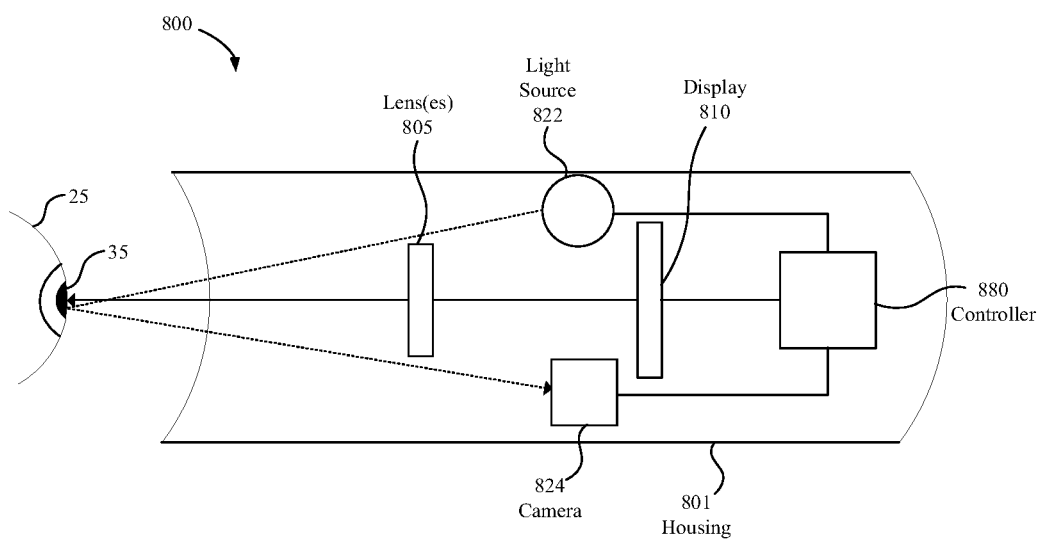
FIG. 8 is a block diagram of an example head-mounted device (HMD) in accordance with some implementations.

FIG. 8 illustrates a block diagram of an exemplary head-mounted device 800 in accordance with some implementations. The head-mounted device 800 includes a housing 801 (or enclosure) that houses various components of the head-mounted device 800. The housing 801 includes (or is coupled to) an eye pad (not shown) disposed at a proximal (to the user 25) end of the housing 801. In various implementations, the eye pad is a plastic or rubber piece that comfortably and snugly keeps the head-mounted device 800 in the proper position on the face of the user 25 (e.g., surrounding the eye of the user 25).

The housing 801 houses a display 810 that displays an image, emitting light towards or onto the eye of a user 25. In various implementations, the display 810 emits the light through an eyepiece having one or more lenses 805 that refracts the light emitted by the display 810, making the display appear to the user 25 to be at a virtual distance farther than the actual distance from the eye to the display 810. For the user 25 to be able to focus on the display 810, in various implementations, the virtual distance is at least greater than a minimum focal distance of the eye (e.g., 7 cm). Further, in order to provide a better user experience, in various implementations, the virtual distance is greater than 1 meter.

The housing 801 also houses a tracking system including one or more light sources 822, camera 824, and a controller 880. The one or more light sources 822 emit light onto the eye of the user 25 that reflects as a light pattern (e.g., a circle of glints) that can be detected by the camera 824. Based on the light pattern, the controller 880 can determine an eye tracking characteristic of the user 25. For example, the controller 880 can determine a gaze direction and/or a blinking state (eyes open or eyes closed) of the user 25. As another example, the controller 880 can determine a pupil center, a pupil size, or a point of regard. Thus, in various implementations, the light is emitted by the one or more light sources 822, reflects off the eye of the user 25, and is detected by the camera 824. In various implementations, the light from the eye of the user 25 is reflected off a hot mirror or passed through an eyepiece before reaching the camera 824.

The display 810 emits light in a first wavelength range and the one or more light sources 822 emit light in a second wavelength range. Similarly, the camera 824 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

Figure 9:
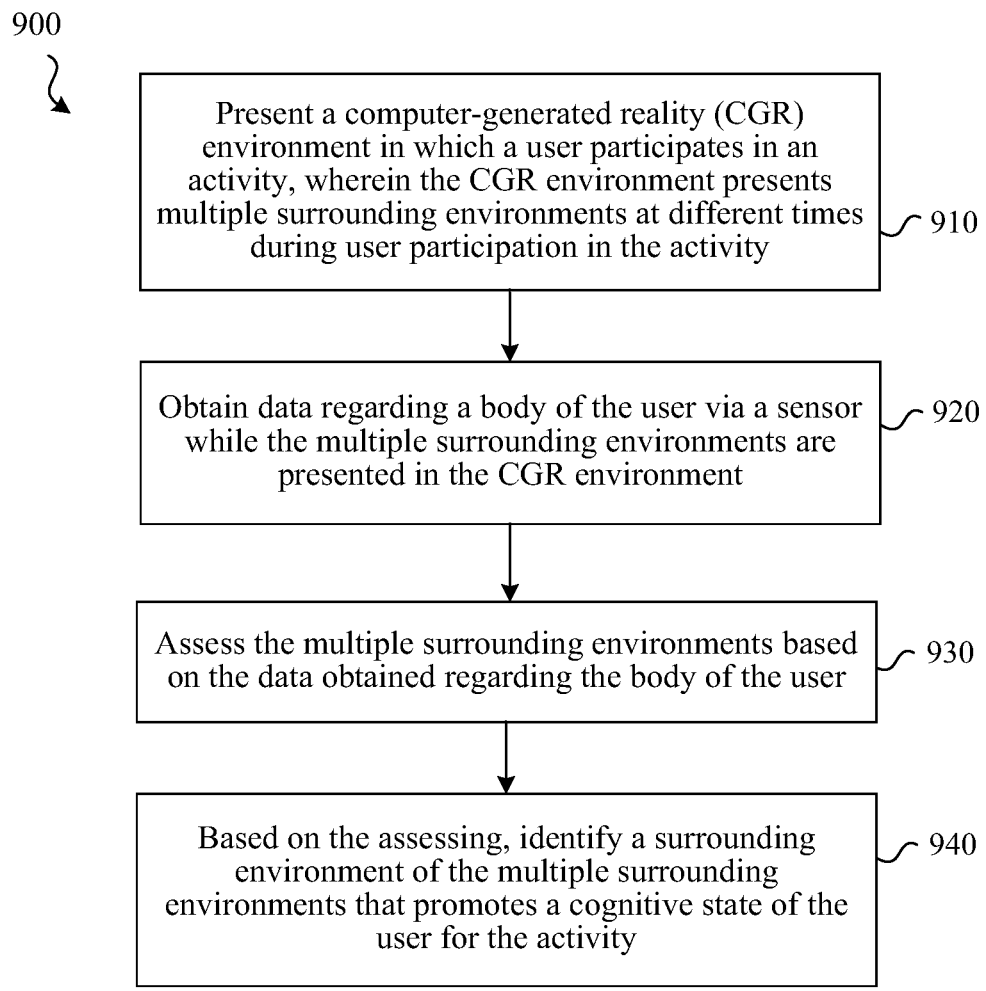
FIG. 9 is a flowchart illustrating an exemplary method of updating an environment, according to some implementations.

FIG. 9 is a flowchart illustrating an exemplary method of identifying a surrounding environment that promotes a cognitive state of a user for a particular user activity, according to some implementations. In some implementations, the method 900 is performed by a device (e.g., device 10 of FIGS. 1, 7, and 8). The method 900 may be performed at a mobile device, HMD, desktop, laptop, server device, or by multiple devices in communication with one another. In some implementations, the method 900 is performed by processing logic, including hardware, firmware, software, or a combination thereof. In some implementations, the method 900 is performed by a processor executing code stored in a non-transitory computer-readable medium (e.g., a memory).

At block 910, the method 900 presents a CGR environment in which a user participates in an activity (e.g., working, learning, resting). In some implementations, the CGR environment presents multiple surrounding environments (e.g., audio or visual) at different times during user participation in the activity. For example, the method 900 may present the user with a control environment of a living room, and one or more other surrounding environments, such as a forest or a coffee shop.

At block 920, the method 900 obtains data regarding a body of the user via a sensor while the multiple surrounding environments are presented in the CGR environment. For example, physiological data may be obtained via a heart rate sensor, pulse oximeter, blood pressure sensor, temperature sensor, EKG sensor, EEG sensor, EMG sensor, fNIRS sensor, GSR sensor, etc. Moreover, inward facing cameras may record eye characteristics (e.g., eye tracking or pupillary response) or downward-facing cameras may record facial expressions. In some implementations, image-based or sensor-based hand/body tracking may be used to identify movements associated with cognitive states such as stress, relaxation, etc.

At block 930, the method 900 assesses the multiple surrounding environments based on the data obtained regarding the body of the user. For example, the method 900 may assess how well each of the surrounding environments promotes a cognitive state appropriate for the user activity. In some implementations, each surrounding environment is assessed based on comparing the data obtained regarding the body of the user in response to one or more other surrounding environments. In some implementations, the multiple surrounding environments may be assessed based on overt subjective responses from the user (e.g., voice inputs, hand gestures, touch input, keystrokes, etc.). For example, a user may specify a preference for, or an aversion to, one or more surrounding environments and the user response may be used in combination with the data obtained regarding the body of the user to assess the one or more surrounding environments.

At block 940, the method 900, based on the assessing, identifies a surrounding environment of the multiple surrounding environments that promotes a cognitive state of the user for the activity. For example, the method 900 may pick the optimal environment that puts the user in the best resting state. In some implementations, the method 900 changes one or more parameters (e.g., colors, light level, décor, sound or music, volume, etc.) of the surrounding environment and identifies parameters that promote the cognitive state of the user for the activity.

Figure 10:
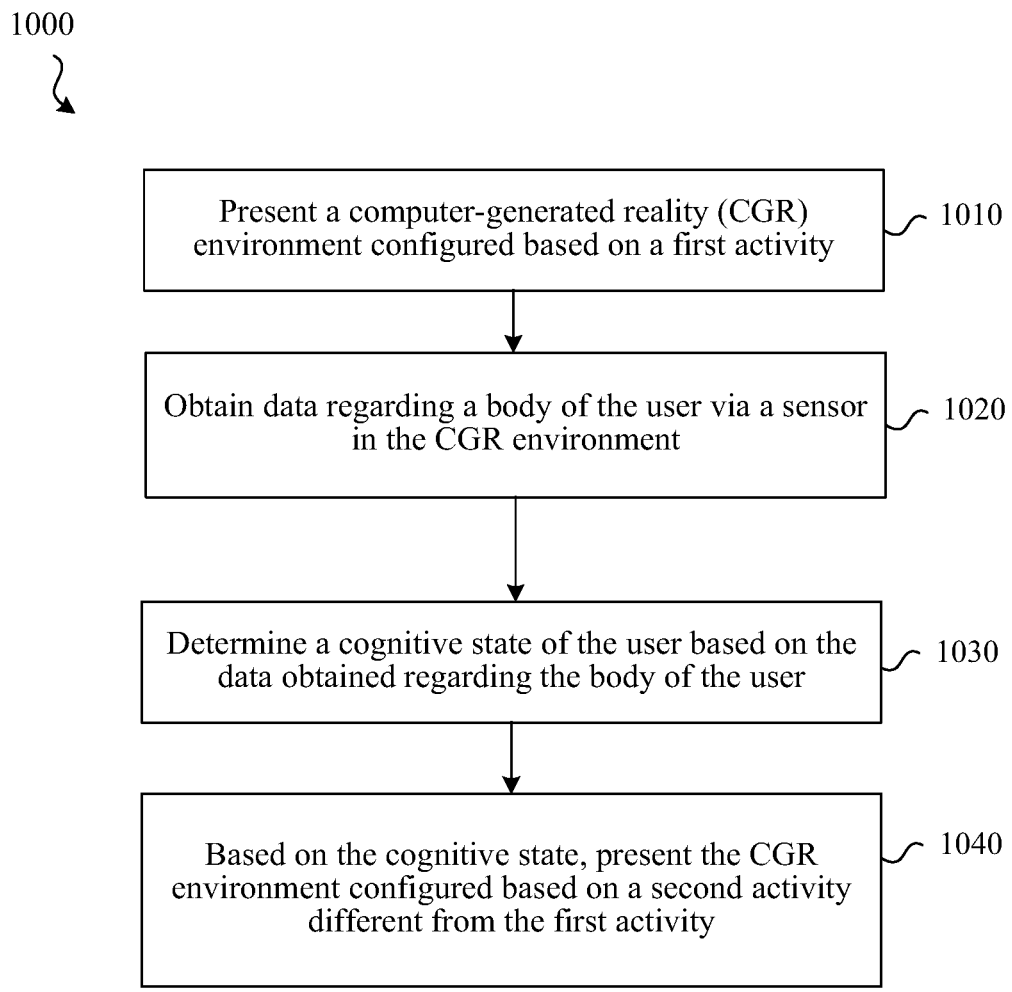
FIG. 10 is a flowchart illustrating an exemplary method of identifying a surrounding environment that promotes a cognitive state of a user for an activity.

FIG. 10 is a flowchart illustrating an exemplary method of changing a CGR environment based on a detected cognitive state, according to some implementations. In some implementations, the method 1000 is performed by a device (e.g., device 10 of FIGS. 1, 7, and 8). The method 1000 may be performed at a mobile device, HMD, desktop, laptop, server device, or by multiple devices in communication with one another. In some implementations, the method 1000 is performed by processing logic, including hardware, firmware, software, or a combination thereof. In some implementations, the method 900 is performed by a processor executing code stored in a non-transitory computer-readable medium (e.g., a memory).

At block 1010, the method 1000 presents a CGR environment configured based on an activity of the user. For example; the CGR environment may be a coffee shop when the activity is working, a library when the activity is learning, a forest when the activity is relaxing, etc.

At block 1020, the method 1000 obtains data regarding a body of the user via a sensor while the multiple surrounding environments are presented in the CGR environment. For example, physiological data may be obtained via a heart rate sensor, pulse oximeter, blood pressure sensor, temperature sensor, EKG sensor, EEG sensor, EMG sensor, fNIRS sensor, GSR sensor, etc. Moreover, inward facing cameras may record eye characteristics (e.g., eye tracking or pupillary response) or downward-facing cameras may record facial expressions. In some implementations, image-based or sensor-based hand/body tracking may be used to identify movements associated with cognitive states such as stress, relaxation, etc.

At block 1030, the method 1000 determines a cognitive state of the user based on the data obtained regarding the body of the user. For example, the method 1000 may determine that the user is fatigued, rested, etc. In some implementations, cognitive states are classified by identifying body movement or characteristics of the user and associating the identified body movement or characteristic with a cognitive state. In some implementations, multiple forms of body data are utilized to increase the accuracy of classification of cognitive states. For example, a machine learning algorithm may classify the cognitive state based on the user's eye characteristics, facial expressions, body movements, and other physiological data (e.g., heartrate, temperature, electro-cardiogram, etc.).

In some implementations, the cognitive state is determined using a statistical or machine learning-based classification technique. In some implementations, body data is aggregated and classified into different cognitive states using statistical or machine-learning based techniques. For example, a machine-learning model may be trained to classify a facial expression into one or a fixed number of classes of cognitive states.

At block 1040, the method 1000, based on the cognitive state, presents the CGR environment configured based on an activity different from the first activity. For example, the method 1000 may switch from an environment associated with working (e.g., coffee shop) to an environment associated with resting (e.g., forest) when a fatigued cognitive state is detected. In another example, the method 1000 may switch from an environment associated with resting (e.g., forest) to an environment associated with working (e.g., coffee shop) when a rested/relaxed/rejuvenated cognitive state is detected. In some implementations, the method 1000 may change the CGR environment automatically or based on providing a recommendation and receiving input from the user (e.g., voice input, hand gestures, touch input, keystrokes, etc.). For example, when the method 1000 detects the user's cognitive state has again changed, the method may change the environment back.

In some implementations, the method 1000 continues to obtain data regarding the body of the user via the sensor in the CGR and updates the CGR environment in response to determining another change in the cognitive state of the user. For example, the method 1000 may determine that the user's cognitive state has become peaceful during a break from a working activity, and may change from a resting environment (e.g., forest) back to a working environment (e.g., coffee shop).

In some implementations, the method 1000 provides feedback to the user based on the user's cognitive state. For example, the method 1000 may provide a notification for the user to take a break. In some implementations, updating the CRG environment includes displaying a message to make the user aware of his or her cognitive state.

In some implementations, the method 1000 provides feedback to a content creator to facilitate improvements to the content or future/related content. A notification may identify a portion of the content associated with a cognitive state for one or more users, e.g., identifying that a particular surrounding environment is preferable to a portion of the content users performing the same activity. In some implementations, cognitive state data for multiple users who have viewed a surrounding environment is aggregated to provide feedback regarding the surrounding environment. The content creator may revise the surrounding environment based on such feedback to further promote the cognitive states of users experiencing the CGR content.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of data to improve a user's experience of an electronic device with respect to using electronic content. The present disclosure contemplates that in some instances, this gathered data may include personal information data that uniquely identifies a specific person or can be used to identify interests, traits, or tendencies of a specific person. For example, a device may learn preferences for a variety of different users (e.g., enabled through biometric identification). Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at a device comprising a processor:
        obtaining data regarding a body via a sensor while presenting a first computer-generated reality (CGR) environment during participation in an activity;
        determining a type of the activity based on the data obtained regarding the body and based on data associated with the first CGR environment, wherein the type of the activity is selected from a group comprising working, learning, and resting; and
        identifying a second CGR environment that promotes a particular cognitive state based on the determined type of the activity.

2. The method of claim 1, wherein identifying the second CGR environment comprises changing parameters that promote the particular cognitive state for the type of the activity.

3. The method of claim 2, wherein the parameters are selected from a group consisting of colors, light level, décor, sound or music, and volume.

4. The method of claim 1, wherein determining the type of the activity comprises determining a current cognitive state.

5. The method of claim 4, wherein the current cognitive state is determined based on assessing physiological signals that comprise at least one of an eye-tracking signal, a pupil diameter signal, a heart rate signal, and a respiratory rate signal.

6. The method of claim 4, wherein the current cognitive state is determined based on assessing physiological signals that comprise at least one of neural signals and behavioral signals.

7. The method of claim 1, wherein the sensor is selected from a group consisting of a heart rate sensor, a pulse oximeter, a blood pressure sensor, a temperature sensor, an electro-cardiogram (EKG) sensor, an electroencephalography (EEG) sensor, an electromyography (EMG) sensor, a functional near infrared spectroscopy signal (fNIRS) sensor, and a galvanic skin response (GSR) sensor.

8. The method of claim 1, wherein the sensor is selected from a group consisting of an inward facing camera and a downward-facing camera.

9. The method of claim 1, wherein the data regarding the body includes hand/body tracking, wherein the method further comprises using the hand/body tracking to identify movements associated with the particular cognitive state.

10. The method of claim 1, wherein the first CGR environment and the second CGR environment are associated with multiple surrounding environments, the method further comprising presenting multiple surrounding environments at different times during participation in the activity.

11. The method of claim 1, further comprising providing a recommendation and receiving an input.

12. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
obtaining data regarding a body via a sensor while presenting a first computer-generated reality (CGR) environment during participation in an activity;
determining a type of the activity based on the data obtained regarding the body and based on data associated with the first CGR environment, wherein the type of the activity is selected from a group comprising working, learning, and resting; and
identifying a second CGR environment that promotes a particular cognitive state based on the determined type of the activity.

13. The device of claim 12, wherein identifying the second CGR environment comprises changing parameters that promote the particular cognitive state for the type of the activity.

14. The device of claim 13, wherein the parameters are selected from a group consisting of colors, light level, décor, sound or music, and volume.

15. The device of claim 12, wherein determining the type of the activity comprises determining a current cognitive state.

16. The device of claim 15, wherein the current cognitive state is determined based on assessing physiological signals that comprise at least one of an eye-tracking signal, a pupil diameter signal, a heart rate signal, and a respiratory rate signal.

17. The device of claim 15, wherein the current cognitive state is determined based on assessing physiological signals that comprise at least one of neural signals and behavioral signals.

18. The device of claim 12, wherein the sensor is selected from a group consisting of a heart rate sensor, a pulse oximeter, a blood pressure sensor, a temperature sensor, an electro-cardiogram (EKG) sensor, an electroencephalography (EEG) sensor, an electromyography (EMG) sensor, a functional near infrared spectroscopy signal (fNIRS) sensor, and a galvanic skin response (GSR) sensor.

19. The device of claim 12, wherein the sensor is selected from a group consisting of an inward facing camera and a downward-facing camera.

20. A non-transitory computer-readable storage medium storing program instructions on a device that are computer-executable to perform operations comprising:
obtaining data regarding a body via a sensor while presenting a first computer-generated reality (CGR) environment during participation in an activity;
determining a type of the activity based on the data obtained regarding the body and based on data associated with the first CGR environment, wherein the type of the activity is selected from a group comprising working, learning, and resting; and
identifying a second CGR environment that promotes a particular cognitive state based on the determined type of the activity.

* * * * *